(12) United States Patent
Shinkai

(10) Patent No.: US 11,782,857 B2
(45) Date of Patent: Oct. 10, 2023

(54) EXPANSION BASE UNIT, CONTROL DEVICE, CONTROL SYSTEM, AND CONTROL METHOD

(71) Applicant: Mitsubishi Electric Corporation, Tokyo (JP)

(72) Inventor: Koichi Shinkai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/917,251

(22) PCT Filed: May 19, 2020

(86) PCT No.: PCT/JP2020/019793
§ 371 (c)(1),
(2) Date: Oct. 6, 2022

(87) PCT Pub. No.: WO2021/234819
PCT Pub. Date: Nov. 25, 2021

(65) Prior Publication Data
US 2023/0122878 A1    Apr. 20, 2023

(51) Int. Cl.
*G06F 13/20* (2006.01)
*G05B 19/05* (2006.01)
(52) U.S. Cl.
CPC ...... *G06F 13/20* (2013.01); *G06F 2213/4002* (2013.01)
(58) Field of Classification Search
CPC ................................ G05B 19/054; G05D 7/0617
See application file for complete search history.

(56) References Cited

U.S. PATENT DOCUMENTS

| 10,678,729 | B1* | 6/2020 | Kwon ............... G05B 19/054 |
| 2005/0185599 | A1 | 8/2005 | Clayton |
| 2013/0190935 | A1* | 7/2013 | Nickerson ........... G05D 7/0617 700/284 |
| 2019/0122152 | A1* | 4/2019 | McCoy ........... G06Q 10/06313 |
| 2019/0260385 | A1* | 8/2019 | Niwa .................... H03M 1/12 |
| 2019/0346166 | A1* | 11/2019 | Koizumi ............... F24F 11/89 |

(Continued)

FOREIGN PATENT DOCUMENTS

| CN | 1991650 A | 7/2007 |
| CN | 109039371 A | 12/2018 |
| DE | 10 2006 061 063 A1 | 6/2007 |

(Continued)

OTHER PUBLICATIONS

International Search Report and Written Opinion dated Jul. 28, 2020, received for PCT Application PCT/JP2020/019793, filed on May 19, 2020, 8 pages including English Translation.

(Continued)

*Primary Examiner* — Getente A Yimer
(74) *Attorney, Agent, or Firm* — XSENSUS LLP

(57) ABSTRACT

An expansion base unit includes an input connector communicatively connectable with a cable to a connector in a previous base unit to allow receipt of a signal from the previous base unit, and a plurality of output connectors that each are communicatively connectable with a cable to a connector of a plurality of connectors in a subsequent expansion base unit to allow transmission of the signal received by the input connector to the subsequent expansion base unit.

18 Claims, 12 Drawing Sheets

(56) References Cited

U.S. PATENT DOCUMENTS

2019/0379165 A1* 12/2019 Zhu ..................... H01R 12/52

FOREIGN PATENT DOCUMENTS

| | | |
|---|---|---|
| DE | 10 2012 000 158 A1 | 7/2012 |
| GB | 2526921 A | 12/2015 |
| JP | 4-190428 A | 7/1992 |
| JP | 11-202911 A | 7/1999 |
| JP | 2007-67540 A | 3/2007 |
| JP | 2007-164722 A | 6/2007 |
| JP | 2015-210711 A | 11/2015 |
| JP | 2018-45399 A | 3/2018 |
| TW | 200541264 A | 12/2005 |
| TW | 201631928 A | 9/2016 |
| TW | M583998 U | 9/2019 |
| TW | M584452 U | 10/2019 |

OTHER PUBLICATIONS

Decision to Grant dated Jan. 5, 2021, received for JP Application 2020-559569, 5 pages including English Translation.
Taiwanese Office Action dated Nov. 11, 2021, received for TW Application 110106848, 5 pages including English Translation.
Office Action dated Mar. 17, 2023 in corresponding Chinese Patent Application No. 202080100892.6 and partial English translation thereof, 11 pages.
Office Action dated Apr. 11, 2023 in corresponding German Patent Application No. 11 2020 006 931.1 with English translation thereof, 16 pages.

* cited by examiner

FIG. 12

| DESTINATION ADDRESS | TRANSFER DESTINATION PORT |
|---|---|
| (ADDRESS OF I/O MODULE 11a) | P6 |
| (ADDRESS OF POWER SUPPLY 12a) | P5 |
| (ADDRESS OF EACH COMPONENT ON EXPANSION BASE UNIT 10b) | P3 |

⋮

EXPANSION BASE UNIT, CONTROL DEVICE, CONTROL SYSTEM, AND CONTROL METHOD

CROSS-REFERENCE TO RELATED APPLICATION

The present application is based on PCT filing PCT/JP2020/019793, filed May 19, 2020, the entire contents of which are incorporated herein by reference.

TECHNICAL FIELD

The present disclosure relates to an expansion base unit, a control device, a control system, and a control method.

BACKGROUND ART

Known techniques for achieving central processing unit (CPU) module multi-redundancy improve the reliability of programmable logic controllers (PLCs). For example, Patent Literature 1 describes a technique for providing dual-redundancy using two CPU modules each connected with a common tracking cable to identify the state of the other CPU module, and an expansion base unit for CPU dual-redundancy connectable to two main base units each connected with the corresponding CPU module.

CITATION LIST

Patent Literature

Patent Literature 1: Unexamined Japanese Patent Application Publication No. 2007-164722

SUMMARY OF INVENTION

Technical Problem

The expansion base unit may be connected with an additional expansion base unit. In an example described in Patent Literature 1, an additional expansion base unit is installed subsequent to the expansion base unit for CPU dual-redundancy, and the expansion base unit for CPU dual-redundancy and the additional expansion base unit are connected to each other using a single cable. For example, when the expansion base unit for CPU dual-redundancy cannot receive a sufficient number of input/output (I/O) modules, an additional expansion base unit is to be installed.

The terms "previous" and "subsequent" are used in relation to the main base unit. In the example in Patent Literature 1, the expansion base unit for CPU dual-redundancy is "subsequent" to the main base unit and "previous" to the additional expansion base unit.

In Patent Literature 1, the expansion base unit for CPU dual-redundancy and the additional expansion base unit are connected using a single cable. In this architecture, when an abnormality such as a break or deterioration occurs in the cable, an abnormality occurs in communication between the CPU modules and components connected to the additional expansion base unit. Thus, the technique described in Patent Literature 1 may be insufficient in providing the reliability of PLCs.

In response to the above issue, an objective of the present disclosure is to provide an expansion base unit connectable to another expansion base unit with multi-redundant cables.

Solution to Problem

To achieve the above objective, an expansion base unit according to an aspect of the present disclosure includes an input connector communicatively connectable with a cable to a connector in a previous base unit to allow receipt of a signal from the previous base unit, and a plurality of output connectors that each are communicatively connectable with a cable to a connector of a plurality of connectors in a subsequent expansion base unit to allow transmission of the signal received by the input connector to the subsequent expansion base unit.

Advantageous Effects of Invention

The expansion base unit according to the above aspect of the present disclosure is connectable to another expansion base unit with multi-redundant cables.

BRIEF DESCRIPTION OF DRAWINGS

FIG. 12 illustrates an example of a transfer destination table stored in a storage in the expansion base unit according to Embodiment 3 of the present disclosure.

DESCRIPTION OF EMBODIMENTS

Figure 1:
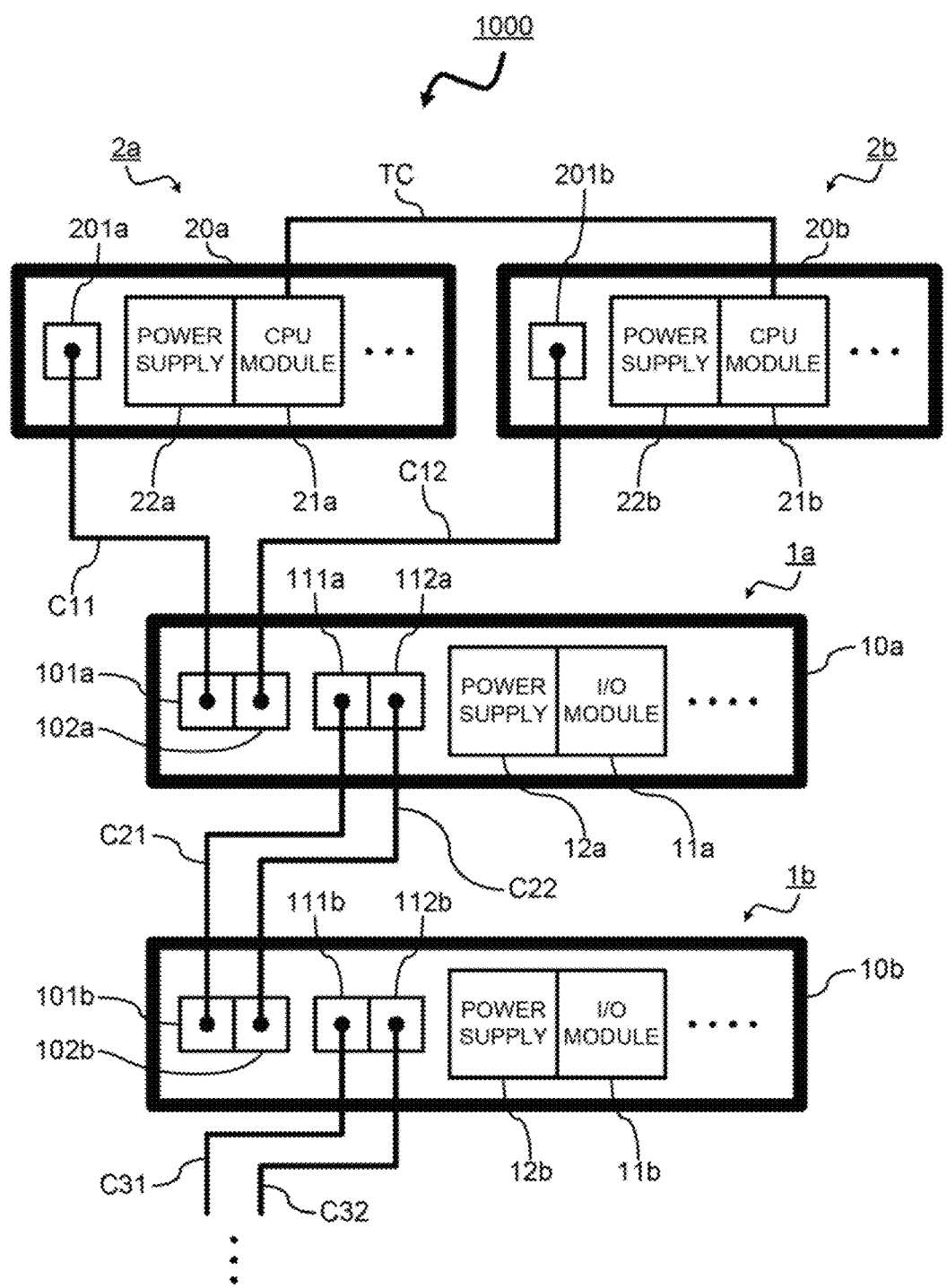
FIG. 1 illustrates configuration of a control system according to Embodiment 1 of the present disclosure.

A control system according to one or more embodiments of the present disclosure is described with reference to the drawings. The same reference signs denote the same or like components in the drawings.

Embodiment 1

A control system 1000 according to Embodiment 1 is described with reference to FIG. 1. The control system 1000 acquires, for example, a sensor value from a sensor and controls a machine tool based on the sensor value. The control system 1000 includes a control device 1a, a control device 1b, a control device 2a, and a control device 2b. The control device 2*a* and the control device 2*b* are communicatively connected to each other with a tracking cable TC. The control device 2*a* and the control device 1*a* are communicatively connected to each other with a bus connection cable C11. Similarly, the control device 2*b* and the control device 1*a* are communicatively connected to each other with a bus connection cable C12. The control device 1*a* and the control device 1*b* are communicatively connected to each other with a bus connection cable C21 and a bus connection cable C22. Similarly, the control device 1*b* and another non-illustrated control device are communicatively connected to each other with a bus connection cable C31 and a bus connection cable C32. The other non-illustrated control device may be communicatively connected to still another control device with bus connection cables. The control system 1000 is an example of a control system in an aspect of the present disclosure. The bus connection cables C are examples of cables in an aspect of the present disclosure.

For simplicity, the control device 1*a* and the control device 1*b* may hereafter be collectively referred to as control devices 1. Similarly, the control device 2*a* and the control device 2*b* may hereafter be collectively referred to as control devices 2. The same applies to the other components described later.

In the control system 1000, the control device 2*a* and the control device 2*b* provide the dual-redundancy of the control devices 2. In the control system 1000, the bus connection cable C21 and the bus connection cable C22 provide the dual-redundancy of the bus connection cables that connect the control device 1*a* and the control device 1*b*. In the control system 1000, the control devices 1 are connected in a row to the control devices 2.

Each control device 1 includes an expansion base unit 10, an I/O module 11, and a power supply 12. The I/O module 11 and the power supply 12 are connected to non-illustrated slots in the expansion base unit 10. The I/O module 11 is communicatively connected to a non-illustrated sensor and a non-illustrated machine tool. The power supply 12 powers the expansion base unit 10 and the I/O module 11. The expansion base unit 10 communicates with the components connected to the non-illustrated slots and also communicates with other base units connected with the bus connection cables. These components included in the control device 1 enable the control devices 2 to communicate with the control device 1 and control the sensor and the machine tool connected to the I/O module 11. The control device 1 may include multiple I/O modules 11 or multiple power supplies 12. The control device 1 is an example of a control device in an aspect of the present disclosure. The I/O module 11 is an example of an input-output module in an aspect of the present disclosure. The sensor and the machine tool are examples of external devices in an aspect of the present disclosure.

Each expansion base unit 10 includes an input connector 101, an input connector 102, an output connector 111, and an output connector 112. In FIG. 1, the bus connection cable C11 is connected to an input connector 101*a*, the bus connection cable C12 is connected to an input connector 102*a*, the bus connection cable C21 is connected to an output connector 111*a*, and the bus connection cable C22 is connected to an output connector 112*a*. Similarly, the bus connection cable C21 is connected to an input connector 101*b*, the bus connection cable C22 is connected to an input connector 102*b*, the bus connection cable C31 is connected to an output connector 111*b*, and the bus connection cable C32 is connected to an output connector 112*b*. In other words, the expansion base units 10 are connected in series.

An expansion base unit 10*a* is connected to a main base unit 20*a* and a main base unit 20*b* described later, and thus the expansion base units 10 are connected in a row to the main base units 20.

The two input connectors and the two output connectors included in each expansion base unit 10 enable the expansion base units 10 to be connected to each other with dual-redundant bus connection cables. The two input connectors included in the expansion base unit 10 also enable the two control devices 2 with dual-redundancy, or in other words, the control device 2*a* and the control device 2*b*, to be connected to the expansion base unit 10*a*. The configuration of the expansion base unit 10 is described in detail later. The expansion base unit 10 is an example of an expansion base unit in an aspect of the present disclosure.

The expressions "input" and "output" are herein used based on a signal flow from the previous base unit to the subsequent expansion base unit. Thus, the connectors used for communication with the previous base unit are "input connectors", and the connectors used for communication with the subsequent expansion base unit are "output connectors". The "previous base unit" may be either a main base unit or an expansion base unit.

Each control device 2 includes a main base unit 20, a CPU module 21, and a power supply 22. The control system 1000 includes the control device 2*a* and the control device 2*b*, with a CPU module 21*a* in the control device 2*a* and a CPU module 21*b* in the control device 2*b* connected to each other with the tracking cable TC, thus providing the dual-redundancy of the control devices 2.

The CPU module 21 and the power supply 22 are connected to non-illustrated slots in the main base unit 20. The CPU module 21 controls the sensor and the machine tool connected to the I/O module 11 in the control device 1. The CPU module 21 communicates with the other CPU module 21 connected with the tracking cable TC. As described in detail later, the CPU module 21 transmits a switch control signal to the expansion base unit 10 to switch the output connector used in the expansion base unit 10. The power supply 22 powers the main base unit 20 and the CPU module 21. The control device 2 may include multiple power supplies 22. An I/O module may be connected to a slot in the main base unit 20. The configuration of the CPU module 21 is described in detail later.

The main base unit 20 communicates with the components connected to the non-illustrated slots and also communicates with the expansion base unit 10 connected with the bus connection cable. The main base unit 20 includes an output connector 201. In FIG. 1, the main base unit 20*a* includes an output connector 201*a* connected with the bus connection cable C11, and the main base unit 20*b* includes an output connector 201*b* connected with the bus connection cable C12. The configuration of the main base unit 20 is described in detail later. The main base unit 20 is an example of a main base unit in an aspect of the present disclosure.

These components included in the control device 2 enable the control device 2 to control the sensor and the machine tool connected to the I/O module 11 in the control device 1.

Figure 2:
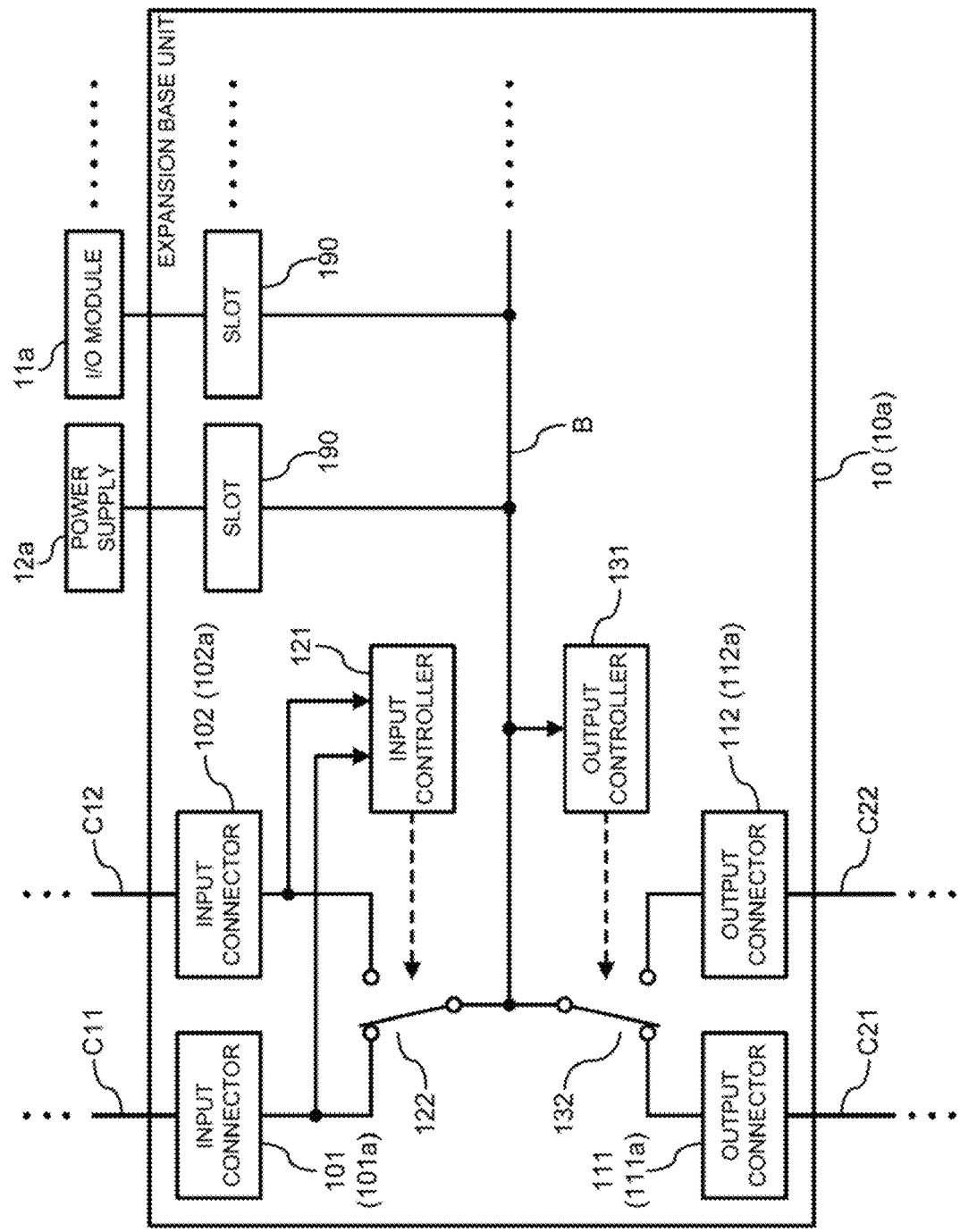
FIG. 2 illustrates configuration of an expansion base unit according to Embodiment 1 of the present disclosure.

The configuration of the expansion base unit 10 is described in detail with reference to FIG. 2. Although the configuration of the expansion base unit 10*a* is illustrated in FIG. 2 as a typical example, an expansion base unit 10*b* and another non-illustrated base unit connected to the expansion base unit 10*b* also have the same configuration.

The expansion base unit 10 includes the input connector 101, the input connector 102, the output connector 111, the output connector 112, an input controller 121, an input switch 122, an output controller 131, an output switch 132, one or more slots 190, and a bus B. The slots 190 are communicatively connected with the bus B. As described in detail later, the input switch 122 communicatively connects the bus B to either the input connector 101 or the input connector 102 under the control of the input controller 121. Similarly, the output switch 132 communicatively connects the bus B to either the output connector 111 or the output connector 112 under the control of the output controller 131. The bus B is an internal bus connecting the input switch 122, the output switch 132, and the slots 190 inside the expansion base unit 10. The bus B is an example of an internal bus in an aspect of the present disclosure.

The input connector 101 and the input connector 102 are communicatively connected to the output connectors of the previous base unit(s) with the bus connection cables. For the expansion base unit 10a, the input connector 101a is communicatively connected to the output connector 201a of the previous main base unit 20a with the bus connection cable C11, and the input connector 102a is communicatively connected to the output connector 201b of the previous main base unit 20b with the bus connection cable C12. The input connector 101 and the input connector 102 are examples of input connectors in an aspect of the present disclosure.

The output connector 111 and the output connector 112 are communicatively connected to the input connectors of the subsequent expansion base unit with the bus connection cables. For the expansion base unit 10a, the output connector 111a is communicatively connected to the input connector 101b of the subsequent expansion base unit 10b with the bus connection cable C21, and the output connector 112a is communicatively connected to the input connector 102b of the subsequent expansion base unit 10b with the bus connection cable C22. The output connector 111 and the output connector 112 are examples of output connectors in an aspect of the present disclosure.

The input controller 121 monitors signals received by the input connector 101 and the input connector 102, identifies the input connector currently used for communication between the previous base unit and the bus B, and connects the identified input connector to the bus B by controlling the input switch 122 described later. The input connector used for the communication and the input connector not used for the communication receive different signals. Thus, the input controller 121 can identify the input connector currently used for the communication between the previous base unit and the bus B by monitoring signals received by the input connector 101 and the input connector 102. For example, the input controller 121 can identify the input connector used for the communication by determining whether clock signals received by the input connectors change periodically or do not change.

As described in detail later, either the input connector 101 or the input connector 102 is used for the communication between the previous base unit and the bus B irrespective of whether the previous base unit corresponds to the single expansion base unit 10 or the two main base units 20.

The input switch 122 communicatively connects, under the control of the input controller 121, the bus B to the input connector currently used for communication between the previous base unit and the bus B. Although FIG. 2 illustrates the input switch 122 as a switch, the input switch 122 is, for example, a switch circuit including a switching element such as a transistor or a relay. The input controller 121 and the input switch 122 each are an example of first connection means in an aspect of the present disclosure.

When receiving a switch control signal from the previous base unit through the bus B, the output controller 131 controls the output switch 132 to switch the output connector connected to the bus B. As described in detail later, when detecting an abnormality in communication between two expansion base units 10, the CPU module 21 transmits a switch control signal to the previous expansion base unit 10 of the two expansion base units 10. Thus, the output controller 131 can receive the switch control signal from the previous base unit through the bus B. As a result, in the expansion base unit 10b, either the input connector 101b or the input connector 102b is used for communication between the expansion base unit 10a and the expansion base unit 10b.

For example, an abnormality may occur in the bus connection cable C21 connecting the output connector 111a of the expansion base unit 10a and the input connector 101b of the expansion base unit 10b, causing a communication failure between the output connector 111a and the input connector 101b. In this example, the output switch 132 connects the output connector 111a and the bus B. In this state, the CPU module 21 detects the abnormality between the output connector 111a and the input connector 101b, and transmits a switch control signal to the expansion base unit 10a that is the previous expansion base unit 10. When receiving the switch control signal from the CPU module 21 through the bus B, the output controller 131 controls the output switch 132 to switch the output connector connected with the bus B from the output connector 111a to the output connector 112a.

The output switch 132 switches, under the control of the output controller 131, the output connector connected to the bus B. More specifically, the output switch 132 communicatively connects the bus B and one of the output connector 111 or the output connector 112 based on a switch control signal received from the previous base unit. Although FIG. 2 illustrates the output switch 132 as a switch, the output switch 132 is, for example, a switch circuit including a switching element such as a transistor or a relay. The output controller 131 and the output switch 132 each are an example of second connection means in an aspect of the present disclosure.

The slots 190 are connected to the bus B and connectable to components such as the I/O module 11 and the power supply 12. The slots 190 communicatively connect the connected components and the bus B.

Figure 3:
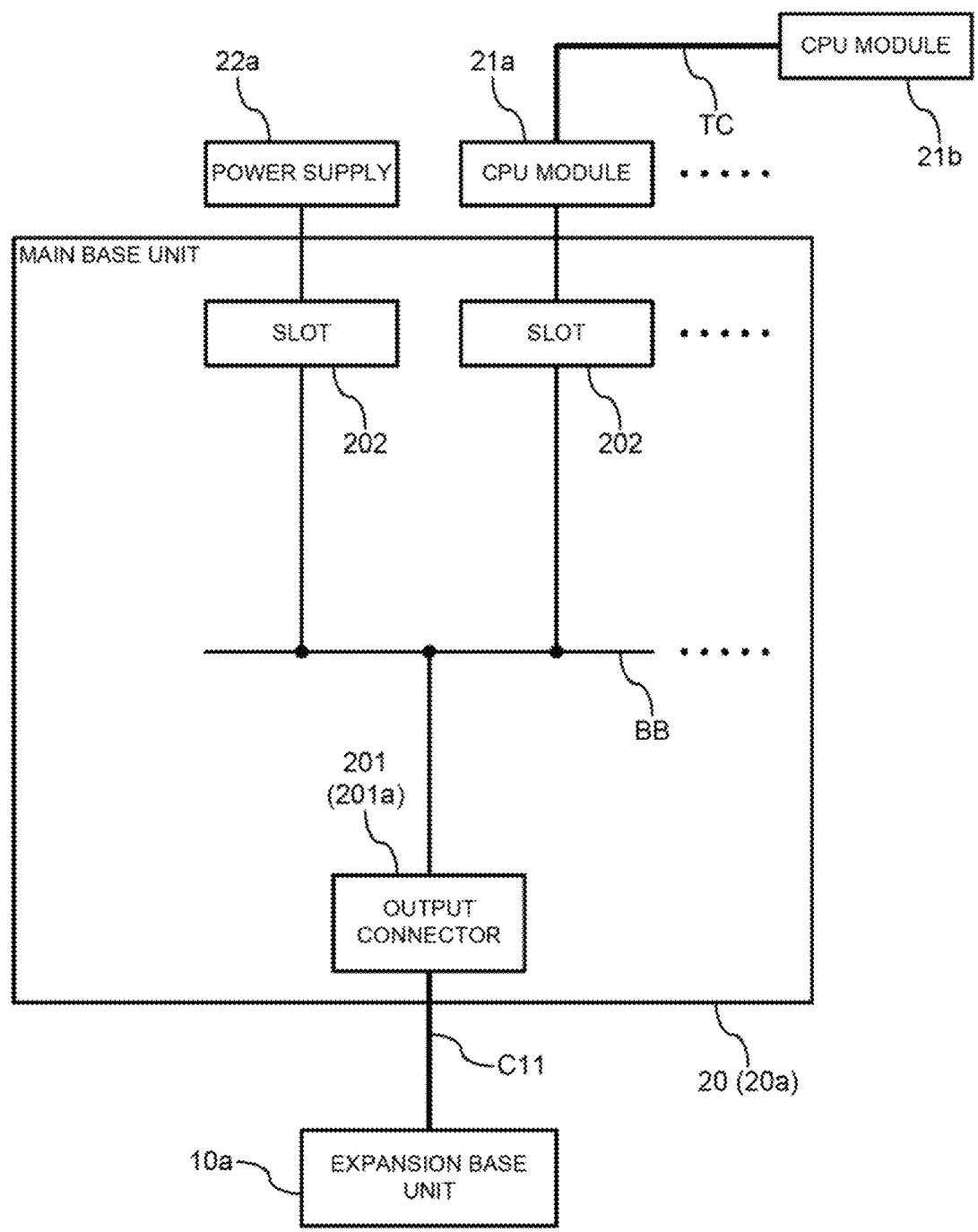
FIG. 3 illustrates configuration of a main base unit according to Embodiment 1 of the present disclosure.

The configuration of the main base unit 20 is described in detail with reference to FIG. 3. Although the configuration of the main base unit 20a is illustrated in FIG. 3 as a typical example, the main base unit 20b also has the same configuration.

The main base unit 20 includes the output connector 201, one or more slots 202, and a bus BB. The output connector 201 and the slots 202 are communicatively connected to the bus BB.

The output connector 201 is communicatively connected to an input connector of the subsequent expansion base unit 10a with a bus connection cable. For the main base unit 20a, the output connector 201a is communicatively connected to the input connector 101a of the subsequent expansion base unit 10a with the bus connection cable C11.

The slots 202 are connected to the bus BB and connectable to components such as the CPU module 21 and the power supply 22. The slots 202 communicatively connect the connected components and the bus BB.

The CPU module 21 connected to a slot 202 communicates with the expansion base unit 10a through the bus BB, the output connector 201, and the bus connection cable. The CPU module 21 also communicates with expansion base units 10 subsequent to the expansion base unit 10a through each expansion base unit 10 previous to those expansion base units 10.

Figure 4:
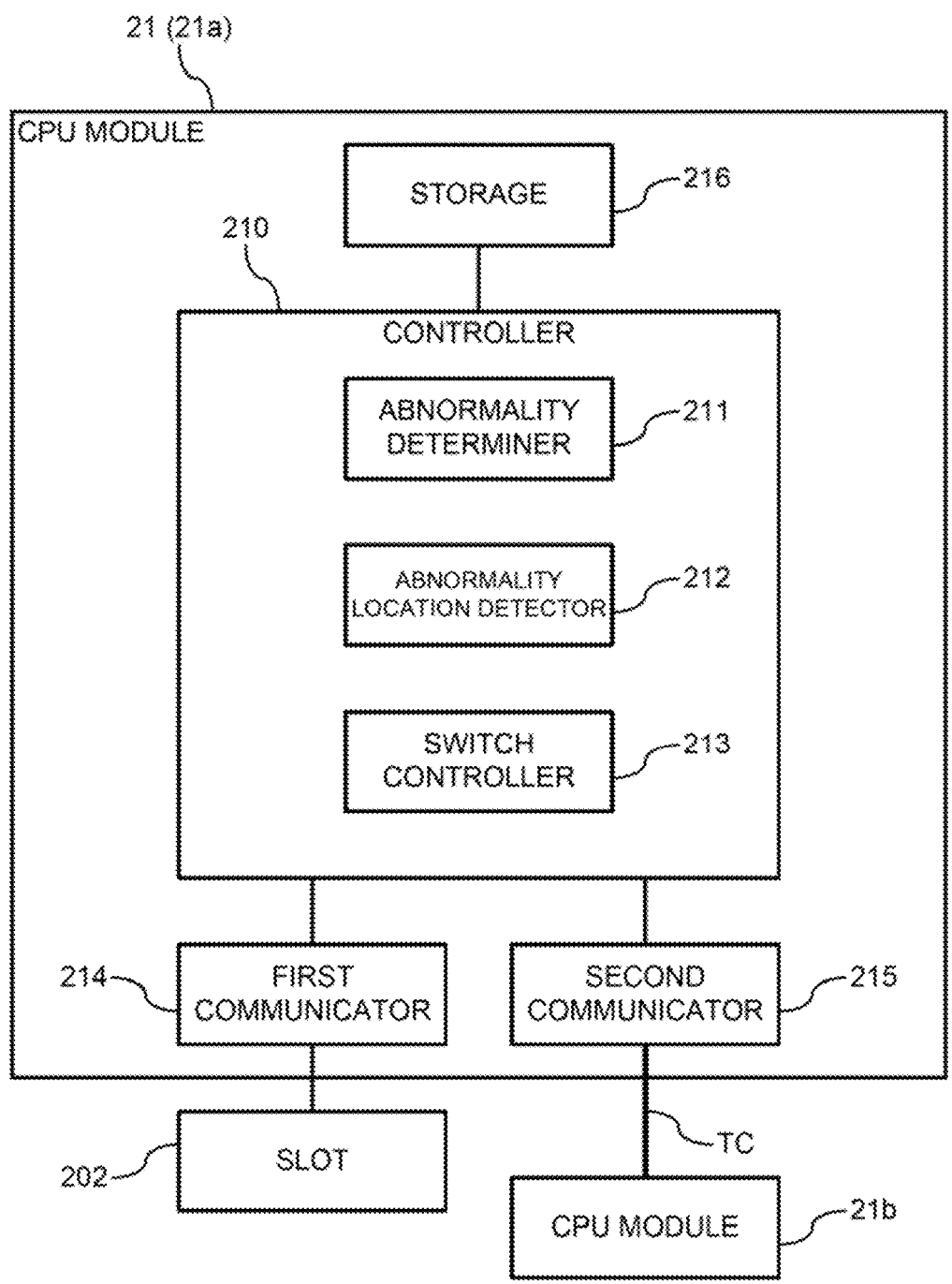
FIG. 4 illustrates configuration of a CPU module in Embodiment 1 of the present disclosure.

The configuration of the CPU module 21 is described in detail with reference to FIG. 4. The CPU module 21 includes a controller 210, a first communicator 214, a second communicator 215, and a storage 216.

The first communicator 214 is, for example, a communication interface insertable into the slot 202. The second communicator 215 is, for example, a communication interface into which the tracking cable TC is insertable.

The storage 216 stores a control program executable by the controller 210. The controller 210 functions as a working memory when the controller 210 executes the control program. The storage 216 includes, for example, a read-only memory (ROM) that stores the control program and a random-access memory (RAM) that functions as the working memory.

The controller 210 reads and executes the control program stored in the storage 216. The controller 210 includes a processor such as a microprocessing unit (MPU) or a CPU. The controller 210 executes the control program to communicate through the first communicator 214 with the components connected to the main base unit 20 and the expansion base unit 10. In particular, the controller 210 communicates with the I/O module 11 connected to the expansion base unit 10 and controls the sensor and the machine tool connected to the I/O module 11.

The controller 210 monitors the state of the other CPU module 21 through the second communicator 215. When the controller 210 and the other CPU module 21 are both in a normal state, the controller 210 communicates with the other CPU module 21 and determines either the controller 210 or the other CPU module 21 to communicate with each module through the first communicator 214.

The controller 210 also executes the control program to function as an abnormality determiner 211, an abnormality location detector 212, and a switch controller 213.

The abnormality determiner 211 determines whether the communication between the CPU module 21 and other components has any abnormality. The other components include, in addition to the components connected to the main base unit 20, the components connected to each expansion base unit 10 connected subsequent to the main base unit 20. The determination as to whether the communication has any abnormality is performed, for example, based on whether any target I/O module 11 returns a response to an access signal that the CPU module 21 has transmitted to the I/O module 11.

When the abnormality determiner 211 determines an abnormality in the communication between the CPU module 21 and another module, the abnormality location detector 212 detects the location of the abnormality on the communication paths. The manner in which the abnormality is located is described later in connection with the operation of switch control.

When the abnormality location detector 212 locates the abnormality in any one of the bus connection cables connecting subsequent expansion base units 10, the switch controller 213 transmits a switch control signal to the previous expansion base unit 10 of the two expansion base units 10 connected with the bus connection cable having the abnormality. This switches the output connector used in the expansion base unit 10 for the communication between the expansion base units 10 to allow communication through one of the dual-redundant bus connection cables that is free of abnormality.

When the abnormality location detector 212 locates the abnormality in internal communication of the main base unit 20 or in the bus connection cable connecting the main base unit 20 to the expansion base unit 10, the switch controller unit 213 communicates with the other CPU module 21 and transmits a signal commanding the other CPU module 21 to switch the control section. In this state, the controller 210 stops communication with each module through the first communicator 214. When receiving, from the other CPU module 21, a signal commanding the control section to be switched, the switch controller 213 starts communication with each module through the first communicator 214. These functions allow either the main base unit 20a or the main base unit 20b to communicate with the expansion base unit 10a. More specifically, these functions switch the control section that controls the sensor and the machine tool. The two control sections are not enabled at the same time, and thus for the expansion base unit 10a, either the input connector 101a or the input connector 102a is used for communication between the main base unit 20 and the expansion base unit 10a.

Figure 5:
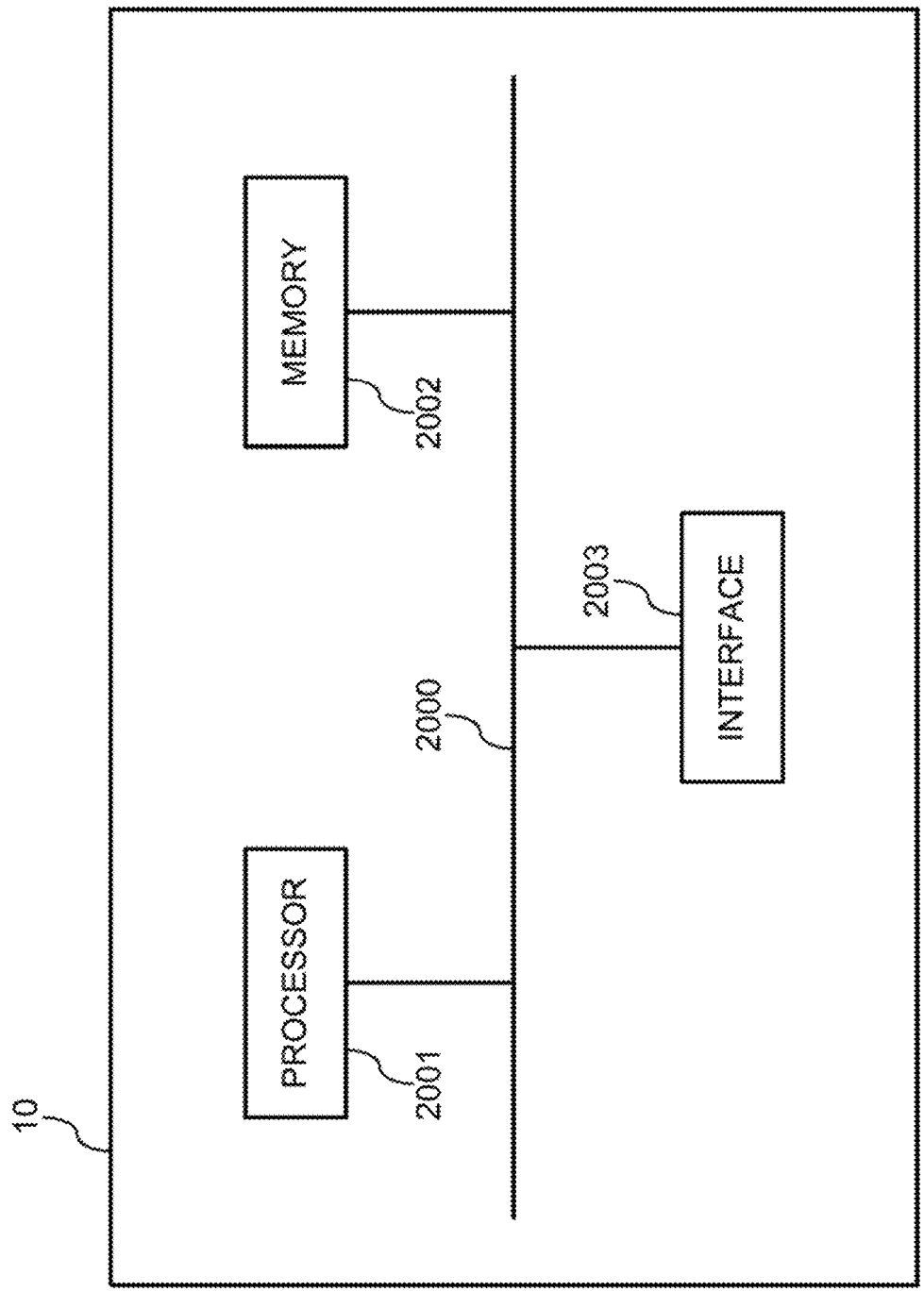
FIG. 5 illustrates an example of hardware configuration of the expansion base unit according to Embodiment 1 of the present disclosure.

An example hardware configuration of the expansion base unit 10 is described with reference to FIG. 5. The expansion base unit 10 illustrated in FIG. 5 is, for example, implemented by a microcontroller. The main base unit 20 may also have a similar hardware configuration.

The expansion base unit 10 includes a processor 2001, a memory 2002, and an interface 2003 connected to one another with a bus 2000.

The processor 2001 is a processor such as an MPU or a CPU. The processor 2001 executes a control program stored in the memory 2002 to implement the functions of the input controller 121 and the output controller 131 in the expansion base unit 10.

The memory 2002 is, for example, a main memory including a ROM and a RAM. The memory 2002 stores the control program executable by the processor 2001. The memory 2002 functions as a working memory when the processor 2001 executes the control program.

The interface 2003 is an input-output interface for communicatively connecting the expansion base unit 10 and another unit. The interface 2003 implements the functions of the input connector 101, the input connector 102, the output connector 111, the output connector 112, and the slots 190.

Figure 6:
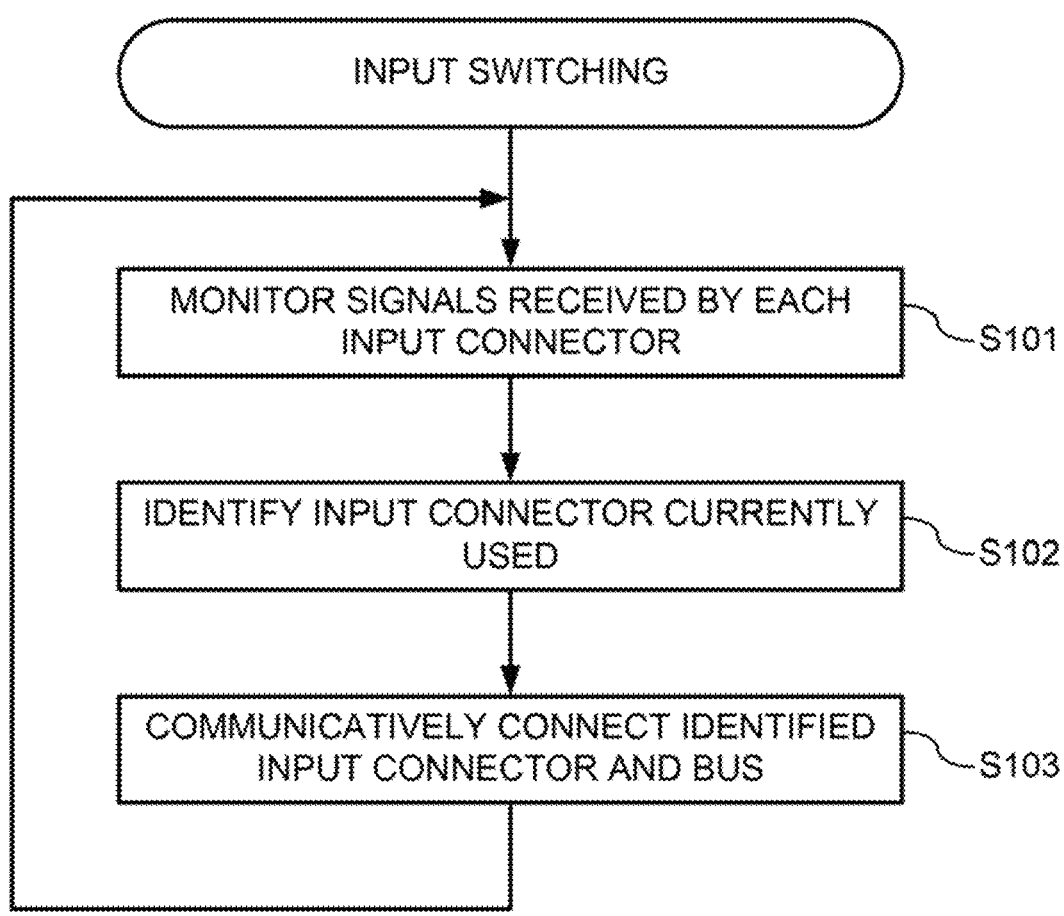
FIG. 6 is a flowchart of an example operation of input switching performed by the expansion base unit according to Embodiment 1 of the present disclosure.

An example operation of input switching performed by the expansion base unit 10 is described with reference to FIG. 6. The operation illustrated in FIG. 6 is started when, for example, the expansion base unit 10 is powered.

The input controller 121 in the expansion base unit 10 monitors signals received by each input connector (step S101).

The input controller 121 identifies, based on the signals monitored in step S101, the input connector currently used for communication with the previous base unit (step S102).

The input controller 121 controls the input switch 122 in the expansion base unit 10 to communicatively connect the bus B and the input connector identified in step S102. When the identified input connector is already connected to the bus B, the input switch 122 remains in that state. The input controller 121 then repeats the operation from step S101.

Figure 7:
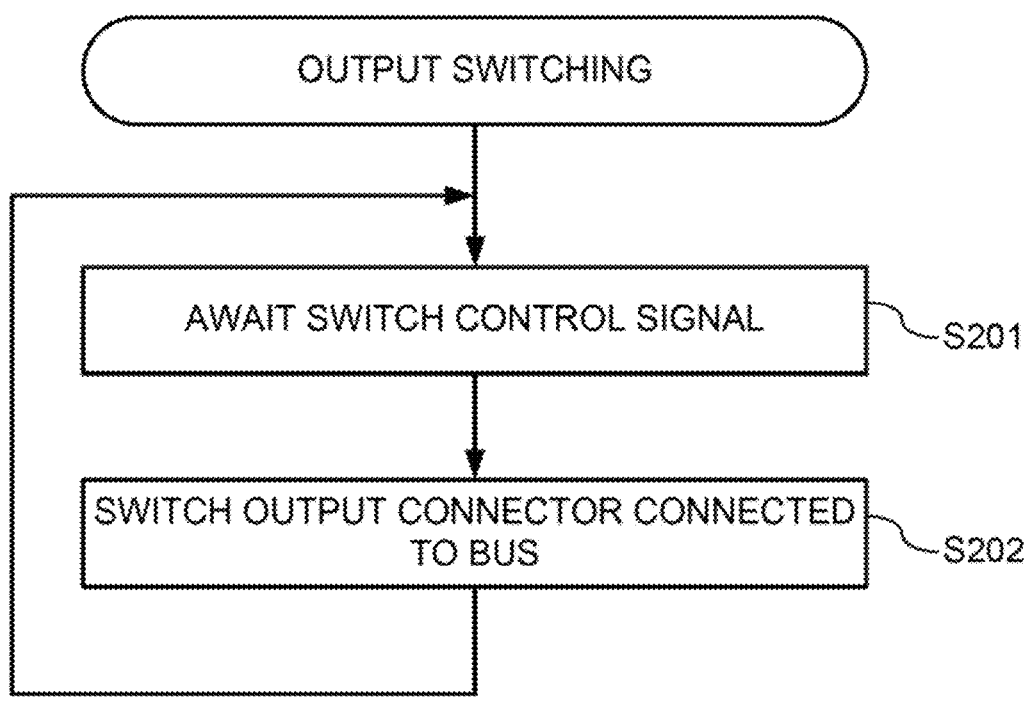
FIG. 7 is a flowchart of an example operation of output switching performed by the expansion base unit according to Embodiment 1 of the present disclosure.

An example operation of output switching performed by the expansion base unit 10 is described with reference to FIG. 7. The operation illustrated in FIG. 7 is started when, for example, the expansion base unit 10 is powered.

The output controller 131 in the expansion base unit 10 awaits a switch control signal transmitted from the previous base unit through the bus B (step S201).

When the output controller 131 receives a switch control signal in step S201, the output controller 131 controls the output switch 132 to switch the output connector connected to the bus B (step S202). The output controller 131 then repeats the operation from step S201.

Figure 8:
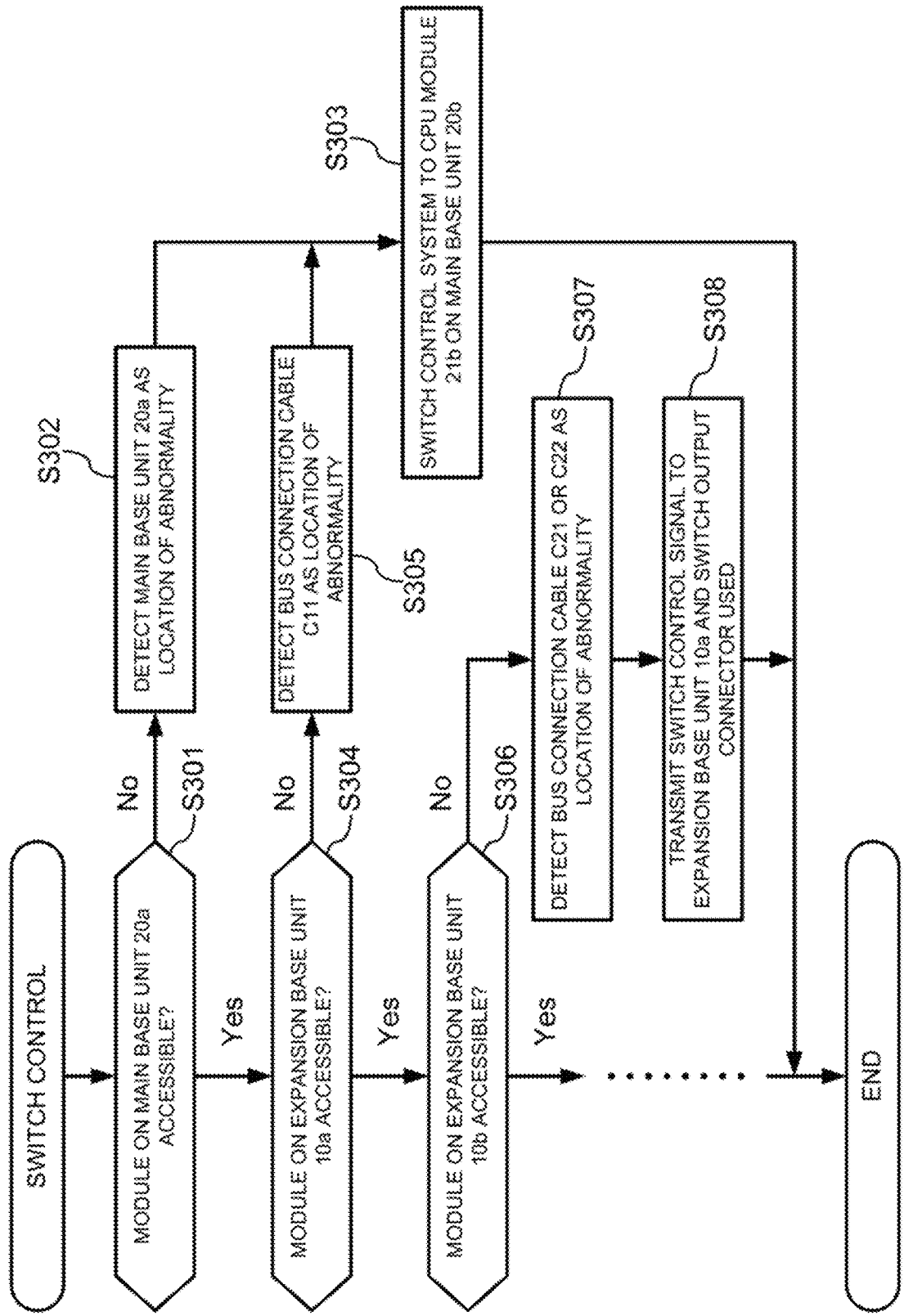
FIG. 8 is a flowchart of an example operation of switch control performed by the CPU module in Embodiment 1 of the present disclosure.

An example operation of switch control performed by the CPU module 21 is described with reference to FIG. 8. The operation illustrated in FIG. 8 is started when the abnormality determiner 211 in the controller 210 in the CPU module 21 determines an abnormality in communication between the CPU module 21 and another module. The operation illustrated in FIG. 8 is an operation performed by the CPU module 21a on the main base unit 20a.

The abnormality location detector 212 in the controller 210 in the CPU module 21a determines whether a component on the main base unit 20a connected with the CPU module 21a is accessible (step S301).

When the module on the main base unit 20a is inaccessible (No in step S301), the abnormality location detector 212 detects the main base unit 20a as the location of the abnormality (step S302).

The switch controller 213 in the controller 210 communicates with the CPU module 21b and switches the control section from the CPU module 21a to the CPU module 21b on the main base unit 20b (step S303). The controller 210 then ends the operation of switch control.

When the module on the main base unit 20a is accessible (Yes in step S301), the abnormality location detector 212 determines whether a component on the expansion base unit 10a connected to the main base unit 20a is accessible (step S304).

When the component on the expansion base unit 10a is inaccessible (No in step S304), the abnormality location detector 212 detects the bus connection cable C11 connecting the main base unit 20a and the expansion base unit 10a as the location of the abnormality (step S305).

Similarly to the above processing, the switch controller 213 communicates with the CPU module 21b and switches the control section from the CPU module 21a to the CPU module 21b on the main base unit 20b (step S303). The controller 210 then ends the operation of switch control.

When the component on the expansion base unit 10a is accessible (Yes in step S304), the abnormality location detector 212 determines whether a component on the expansion base unit 10b connected to the expansion base unit 10a is accessible (step S306).

When the component on the expansion base unit 10b is inaccessible (No in step S306), the abnormality location detector 212 detects the bus connection cable C21 or the bus connection cable C22 connecting the expansion base unit 10a and the expansion base unit 10b as the location of the abnormality (step S307).

The switch controller 213 transmits a switch control signal to the expansion base unit 10a that is the previous one of the expansion base unit 10a or the expansion base unit 10b, and switches the output connector used for communication between the expansion base unit 10a and the expansion base unit 10b (step S308). The controller 210 then ends the operation of switch control.

When the component on the expansion base unit 10b is accessible (Yes in step S306), the controller 210 performs the operation in steps S306 to S308 on the subsequent expansion base unit 10. The switch controller 213 repeats the operation and transmits a switch control signal to the appropriate expansion base unit 10, and then the controller 210 ends the operation of switch control.

The control system 1000 according to Embodiment 1 has been described. In the control system 1000 according to Embodiment 1, each expansion base unit 10 includes two input connectors and two output connectors. The input controller 121 and the input switch 122 connect one of the input connectors to the bus B, whereas the output controller 131 and the output switch 132 connect one of the output connectors to the bus B. Thus, the control system 1000 according to Embodiment 1 enables the expansion base units 10 to be connected to each other with multi-redundant cables.

In the control system 1000 according to Embodiment 1, the I/O module 11, the power supply 12, the main base unit 20, and the power supply 22 may have known hardware configurations without any change. The CPU module 21 may also have the same hardware configuration as a known CPU module, and the different appropriate control program may simply be stored in the storage 216 and executed by the controller 210. Thus, the control system 1000 according to Embodiment 1 is not to include new hardware as the components except the expansion base units 10. Thus, the control system 1000 according to Embodiment 1 enables the expansion base units 10 to be connected to each other with multi-redundant cables at low cost.

In the control system 1000 according to Embodiment 1, the multiple input connectors and output connectors included in each expansion base unit 10 allow use of the same expansion base units that can provide multi-redundancy of cables, thus reducing cost.

Modification of Embodiment 1

Figure 9:
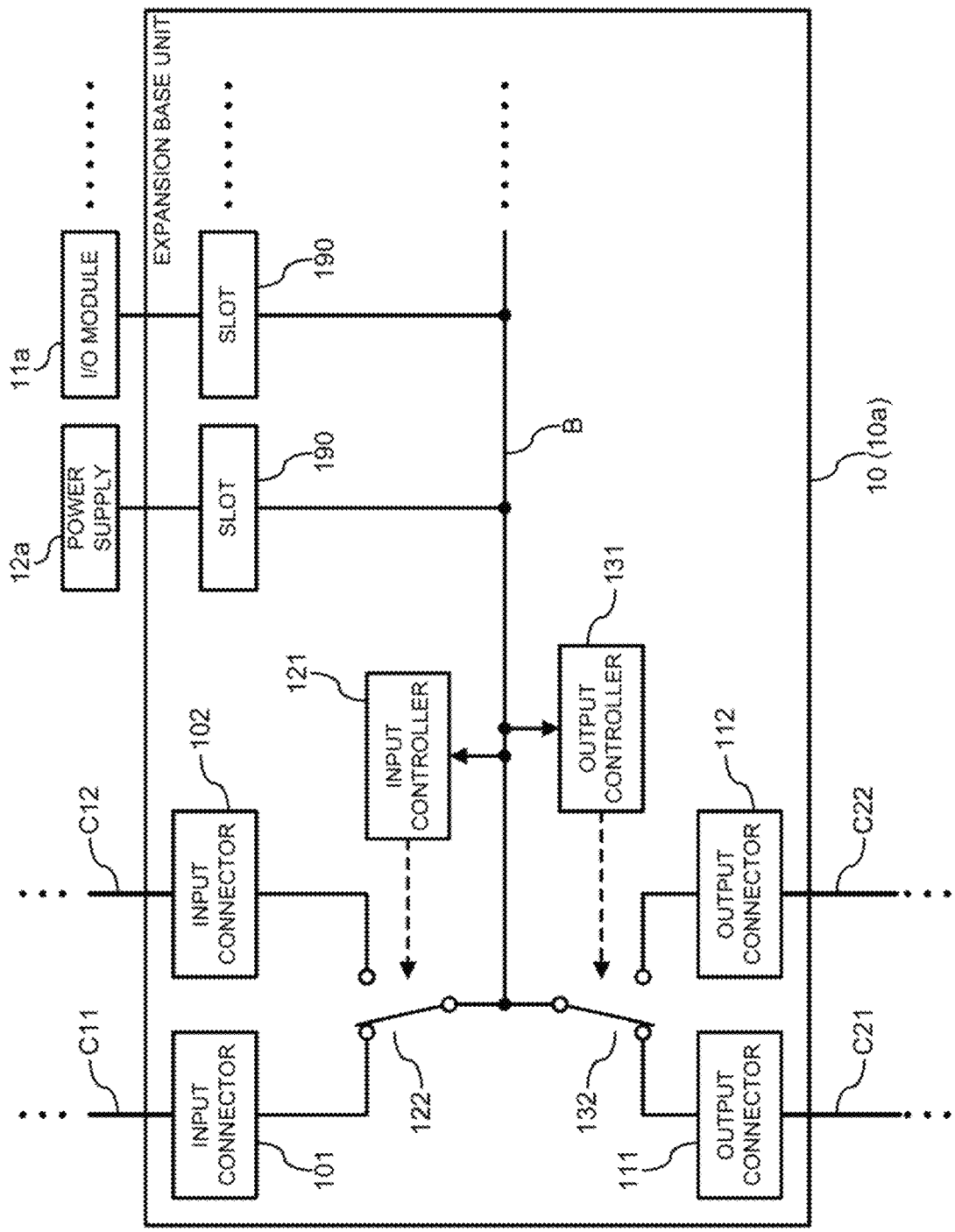
FIG. 9 illustrates configuration of an expansion base unit according to a modification of Embodiment 1 of the present disclosure.

In Embodiment 1, the input controller 121 identifies the input connector currently used for communication between the previous base unit and the bus B by monitoring signals received by the input connector 101 and the input connector 102, and connects the identified input connector to the bus B by controlling the input switch 122. Instead, as illustrated in FIG. 9, the input controller 121 may monitor signals transmitted to the bus B. When detecting an abnormality in signals transmitted to the bus B from the input connector currently connected to the bus B, the input controller 121 may control the input switch 122 to switch the input connector connected to the bus B. For example, when signals transmitted to the bus B remain unchanged for at least a predetermined period, the input controller 121 detects an abnormality in the signals transmitted to the bus B and switches the input connector connected to the bus B. In this modification, although abnormality detection is to be performed, a single target is simply monitored.

In Embodiment 1, each expansion base unit 10 includes the two input connectors and the two output connectors to provide the dual-redundancy of the bus connection cables. However, each expansion base unit 10 may include three or more input connectors and three or more output connectors to provide the multi-redundancy of the bus connection cables. Of the expansion base units 10, the expansion base unit 10a connected directly to the main base unit 20 may include different numbers of input connectors and output connectors. This is because the degree of multi-redundancy of the CPU modules 21 may not be the same as the degree of multi-redundancy of the bus connection cables connecting the expansion base units 10. More specifically, the number of bus connection cables connecting the expansion base units 10 may not be the same as the number of main base units 20 connected to each expansion base unit 10.

In Embodiment 1, cable multi-redundancy is provided between all the expansion base units 10. However, cable multi-redundancy between some expansion base units 10 may be sufficient. In this case, each expansion base unit 10 in a cable multi-redundancy section may include multiple input connectors and multiple output connectors, and each expansion base unit 10 in a cable non-redundancy section may include at least one input connector and at least one output connector. The expansion base unit 10 between the non-redundancy section and the multi-redundancy section may include at least one input connector and multiple output connectors, or multiple input connectors and at least one output connector.

Embodiment 2

A control system 1000 according to Embodiment 2 is described. The control system 1000 according to Embodiment 2 has the same overall configuration as in Embodiment 1 illustrated in FIG. 1. As described in detail later, each expansion base unit 10 in the control system 1000 according to Embodiment 2 includes an output connector 111 and an output connector 112 connected constantly to the bus B, and a selection signal indicating the selected output connector is output to at least one of the output connector 111 or the output connector 112.

Figure 10:
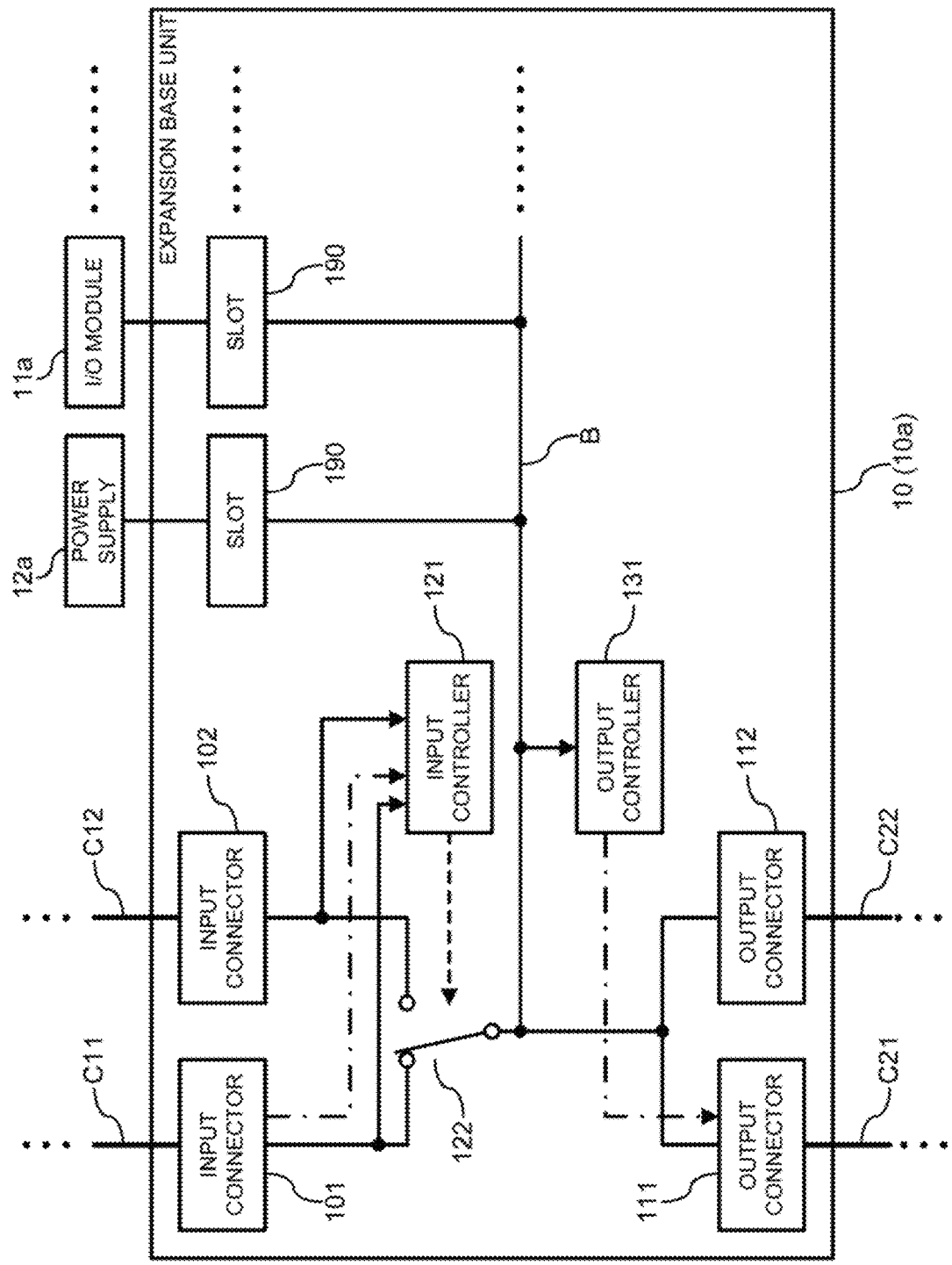
FIG. 10 illustrates configuration of an expansion base unit according to Embodiment 2 of the present disclosure.

Referring to FIG. 10, the configuration of the expansion base unit 10 according to Embodiment 2 is described focusing on differences from the configuration in Embodiment 1. Unlike in Embodiment 1, the expansion base unit 10 according to Embodiment 2 includes no output switch 132, with the output connector 111 and the output connector 112 communicatively connected constantly to the bus B. Unlike in Embodiment 1, the output controller 131 outputs a selection signal (described later) to one of the output connector 111 or the output connector 112. Unlike in Embodiment 1, the input controller 121 connects the bus B to one of the input connector 101 or the input connector 102 that has received a selection signal. In FIG. 10, dash-dot arrows indicate input and output of selection signals. In Embodiment 2, the bus connection cables use signal lines for transmitting selection signals.

The output controller 131 in Embodiment 2 is substantially the same as in Embodiment 1. However, unlike in Embodiment 1, when receiving a switch control signal from the previous base unit through the bus B, the output controller 131 (i) selects, from among the output connectors, a different output connector that is different from a currently-selected output connector and (ii) outputs a selection signal to the different output connector, instead of controlling the output switch 132. In an initialization process, the output controller 131 selects, immediately after the expansion base unit 10 is powered, any one of the output connector 111 or the output connector 112 and outputs a selection signal to the selected output connector. In Embodiment 2, the output controller 131 is an example of selection signal output means in an aspect of the present disclosure.

Unlike in Embodiment 1, the input controller 121 in Embodiment 2 controls the input switch 122 to communicatively connect the bus B to one of the input connector 101 or the input connector 102 that has received a selection signal. However, for the previous base unit being a main base unit 20 that outputs no selection signal, neither the input connector 101 nor the input connector 102 receives a selection signal. In this case, the input controller 121 controls the input switch 122 in the same manner as in Embodiment 1.

The control system 1000 according to Embodiment 2 has been described. The control system 1000 according to Embodiment 2 can produce the same advantageous effects as the control system 1000 according to Embodiment 1 without the output switch 132.

Embodiment 3

A control system 1000 according to Embodiment 3 is described. The control system 1000 according to Embodiment 3 has the same overall configuration as in Embodiment 1 illustrated in FIG. 1. In Embodiment 3, each expansion base unit 10 has a different configuration from the expansion base unit 10 in Embodiment 1. As described in detail later, although the expansion base unit 10 has the different configuration from the expansion base unit 10 in Embodiment 1, the input connectors and the output connectors receive and output the same signals as in Embodiment 1, and the bus connection cables used are the same as in Embodiment 1.

Figure 11:
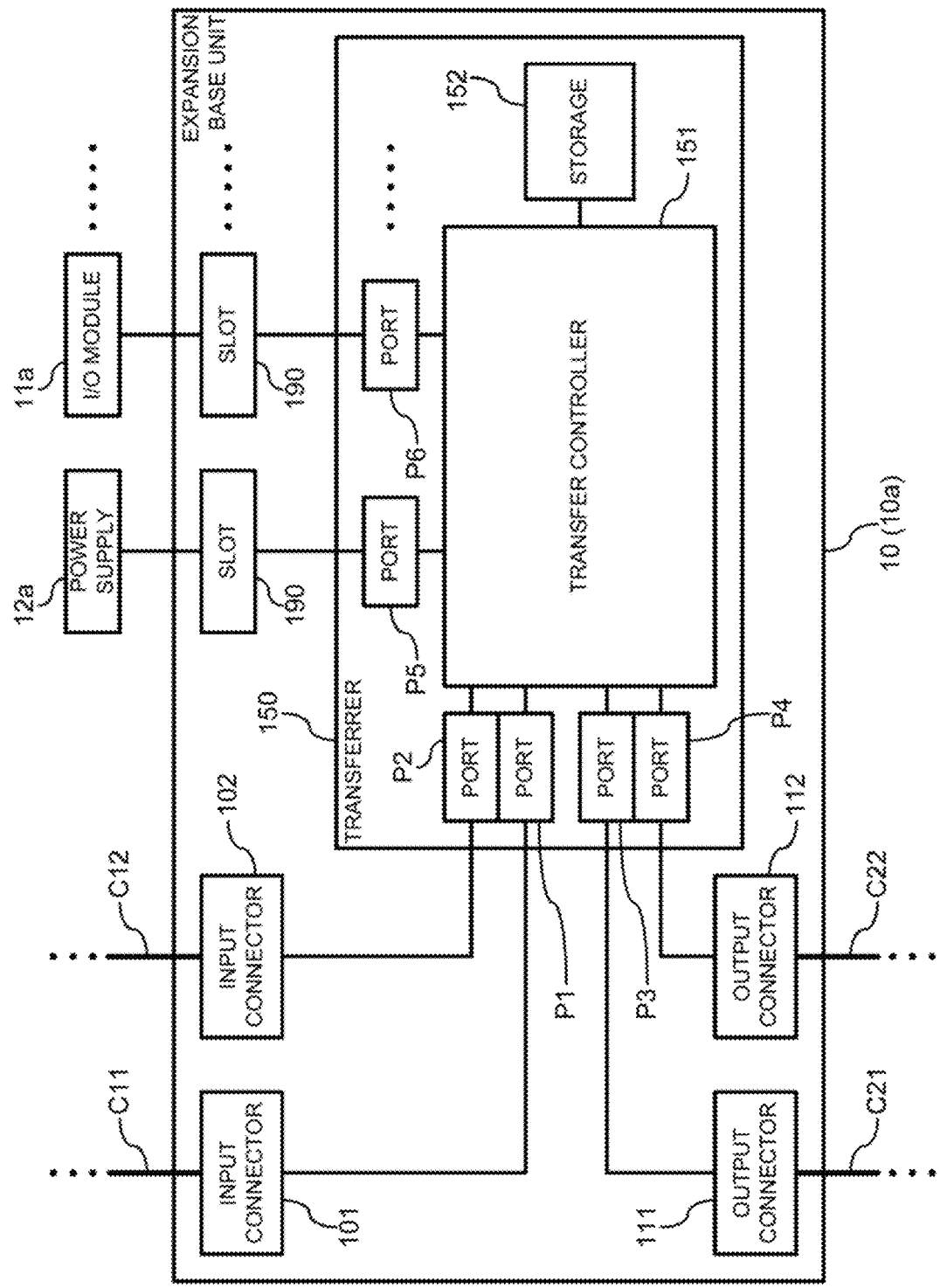
FIG. 11 illustrates configuration of an expansion base unit according to Embodiment 3 of the present disclosure.

Referring to FIG. 11, the configuration of the expansion base unit 10 according to Embodiment 3 is described focusing on the differences from the configuration in Embodiment 1. Unlike in Embodiment 1, the expansion base unit 10 according to Embodiment 3 does not include the input controller 121, the input switch 122, the output controller 131, or the output switch 132. Unlike in Embodiment 1, the expansion base unit 10 includes a transferrer 150. The transferrer 150 includes multiple ports such as ports P1 to P6, a transfer controller 151, and a storage 152. Unlike in Embodiment 1, the input connector 101, the input connector 102, the output connector 111, and the output connector 112 are respectively connected to the ports P1 to P4, and the multiple slots 190 are each connected to a corresponding port of multiple ports including the ports P5 and P6. In the transferrer 150, the function of the transfer controller 151 described later appropriately enables communicatively connecting the input connector 101, the input connector 102, the output connector 111, the output connector 112, and each slot 190. Thus, the transferrer 150 is an example of an internal bus in an aspect of the present disclosure.

The transferrer 150 is, for example, implemented by a microcontroller. In this case, the transfer controller 151 is, for example, an MPU included in the microcontroller. The storage 152 is, for example, a ROM and a RAM included in the microcontroller. Each port is, for example, an I/O interface included in the microcontroller. The function of the transfer controller 151 described later is, for example, implemented by the MPU reading and executing the control program stored in the ROM.

The storage 152 stores a transfer destination table used for a transfer process performed by the transfer controller 151 described later. The transfer destination table is, for example, a table illustrated in FIG. 12. The transfer destination table is described in detail later.

The transfer controller 151 monitors signals received by the port P1 from the input connector 101 and signals received by the port P2 from the input connector 102, and identifies the port currently used for the communication between the previous base unit and the transferrer 150 serving as a bus. In the transfer process described later, the transfer controller 151 transfers the signals received by the identified port to the output connector 111, the output connector 112, or each slot 190. The transfer controller 151 communicatively connects one input connector connected to one identified port and the transferrer 150 serving as a bus. The transfer controller 151 functioning in such a manner is an example of first connection means in an aspect of the present disclosure.

The transfer controller 151 refers to the transfer destination table stored in the storage 152 and transfers a signal received by the identified port to the port corresponding to the destination of the signal. When the transfer destination table is, for example, the table illustrated in FIG. 12, the transfer controller 151 transfers signals directed to an I/O module 11*a* to the port P6, and also transfers signals directed to a component on the expansion base unit 10*b*, such as an I/O module 11*b* or a power supply 12*b*, to the port P3. The transfer process performed by the transfer controller 151 communicatively connects the transferrer 150 serving as a bus and one output connector connected to one port set as a transfer destination port. The transfer controller 151 functioning in such a manner is an example of second connection means in an aspect of the present disclosure.

When receiving a switch control signal from the previous base unit through the identified port, the transfer controller 151 rewrites the transfer destination table stored in the storage 152 to change the transfer destination port for signals directed to each component on the expansion base unit 10*b* from the port P3 connected to the output connector 111 to the port P4 connected to the output connector 112. With this function, the transfer controller 151 can switch the output connector connected to the transferrer 150 serving as a bus when receiving a switch control signal.

In this manner, the transferrer 150 implements the same functions as the input controller 121, the input switch 122, the output controller 131, the output switch 132, and the bus B in Embodiment 1. Thus, the control system 1000 according to Embodiment 3 produces the same advantageous effects as the control system 1000 according to Embodiment 1 with the transferrer 150 included in the expansion base unit 10. The transferrer 150 may be implemented by, for example, a microcontroller as described above, thus allowing the expansion base unit 10 to be designed flexibly at low cost in Embodiment 3. For example, in Embodiment 3, the transferrer 150 that is a microcontroller including a sufficient number of ports can accommodate increased numbers of input connectors and output connectors in the expansion base unit 10 by rewriting the control program executed by the transfer controller 151.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1, 1*a*, 1*b*, 2, 2*a*, 2*b* Control device
10, 10*a*, 10*b* Expansion base unit
11, 11*a*, 11*b* I/O module
12, 12*a*, 12*b* Power supply
20, 20*a*, 20*b* Main base unit
21, 21*a*, 21*b* CPU module
22, 22*a*, 22*b* Power supply
101, 101*a*, 101*b*, 102, 102*a*, 102*b* Input connector
111, 111*a*, 111*b*, 112, 112*a*, 112*b* Output connector
121 Input controller
122 Input switch
131 Output controller
132 Output switch
150 Transferrer
151 Transfer controller
152 Storage
190 Slot
201, 201*a*, 201*b* Output connector
202 Slot
210 Controller
211 Abnormality determiner
212 Abnormality location detector
213 Switch controller
214 First communicator
215 Second communicator
216 Storage
1000 Control system
2000 Bus
2001 Processor
2002 Memory
2003 Interface
B, BB Bus
C11, C12, C21, C22, C31, C32 Bus connection cable
P1 to P6 Port
TC Tracking cable

The invention claimed is:

1. An expansion base comprising:
   an input connector communicatively connectable with a cable to a connector in a previous base to allow receipt of a signal from the previous base; and
   a plurality of output connectors that are communicatively connectable via a plurality if cables to a plurality of connectors in a subsequent expansion base to allow transmission of the signal received by the input connector to the subsequent expansion base via one output connector of the plurality of output connectors, a corresponding cable of the plurality of cables, and a corresponding connector of the plurality of the plurality of connectors in the subsequent expansion base.

2. The expansion base according to claim 1, further comprising:
   an internal bus;
   a first connection to communicatively connect the input connector to the internal bus; and
   a second connection to communicatively connect one output connector of the plurality of output connectors to the internal bus without communicatively connecting another output connector to the internal bus.

3. The expansion base according to claim 2, wherein the second connection switches the output connector connected to the internal bus upon receiving a switch control signal from the previous base through the input connector and the internal bus connected to each other by the first connection.

4. The expansion base according to claim 2, wherein
   the input connector comprises a plurality of the input connectors, and
   the first connection identifies an input connector currently used for communication between the previous base and the internal bus by monitoring a signal received by each input connector of the plurality of input connectors, and communicatively connects the identified input connector to the internal bus.

5. The expansion base according to claim 2, wherein
   the input connector comprises a plurality of the input connectors, the first connection communicatively connects one input connector of the plurality of input connectors to the internal bus, and the first connection monitors a signal transmitted to the internal bus from the input connector connected by the first connection, and switches the input connector connected to the internal bus upon detecting an abnormality in the signal.

6. The expansion base according to claim 1, further comprising:
a selection signal outputter to select one output connector of the plurality of output connectors and output a selection signal to the selected output connector.

7. The expansion base according to claim 6, wherein, when the input connector receives a switch control signal from the previous base, the selection signal outputter (i) selects, from among the plurality of output connectors, a different output connector that is different from a currently-selected output connector and (ii) outputs the selection signal to the selected different output connector.

8. The expansion base according to claim 6, wherein
the input connector comprises a plurality of the input connectors,
each of the plurality of input connectors is communicatively connectable with a cable to a connector of a plurality of connectors in a previous expansion base to allow receipt of a signal from the previous expansion base, and
the expansion base further comprises:
an internal bus, and
a first connection to communicatively connect the internal bus to, among the plurality of input connectors, an input connector receiving a selection signal output from the previous expansion base.

9. A control device comprising:
the expansion base according to claim 1; and
an input-output module communicatively connectable to the expansion base to control an external device.

10. A control system comprising:
a plurality of the expansion bases, each according to claim 1;
an input-output device to control an external device;
a main base; and
a central processor communicatively connectable to the main base, wherein the input-output device is communicatively connectable to one expansion base of the plurality of expansion bases,
the plurality of expansion bases are connected in a row to the main base, and
the central processor communicates with the input-output device through the main base and the expansion base to control the external device.

11. A method for controlling an expansion base, the expansion base including (i) an input connector communicatively connected with a cable to a connector in a previous base and (ii) a plurality of output connectors that are communicatively connected, via a plurality of cables to a plurality of connectors in a subsequent expansion base, the method comprising:
transmitting a signal received by the input connector from the previous base to the subsequent expansion base through one output connector of the plurality of output connectors, a corresponding cable of the plurality of cables, and a corresponding connector of the plurality of the plurality of connectors in the subsequent expansion base.

12. The expansion base according to claim 3, wherein the second connection includes an output processor and a switch, and the output processor is configured to control the switch to switch the output connector.

13. The expansion base according to claim 12, wherein the switch is a solid-state switch.

14. The expansion base according to claim 12, wherein the switch is a relay switch.

15. The expansion base according to claim 4, wherein the input connection includes an input processor and a switch, and the input processor is configured to control the switch to connect the identified input connector based on the signal received by each input connector of the plurality of input connectors.

16. The expansion base according to claim 15, wherein the switch is a solid-state switch.

17. The expansion base according to claim 15, wherein the switch is a relay switch.

18. The expansion base according to claim 1, wherein the expansion base and the subsequent base are connected in series.

* * * * *